(12) United States Patent
Kataoka

(10) Patent No.: US 11,508,974 B2
(45) Date of Patent: Nov. 22, 2022

(54) PRESSURE VESSEL MOUNTING STRUCTURE

(71) Applicant: TOYOTA JIDOSHA KABUSHIKI KAISHA, Aichi-ken (JP)

(72) Inventor: Chiaki Kataoka, Nagakute (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 403 days.

(21) Appl. No.: 16/914,481

(22) Filed: Jun. 29, 2020

(65) Prior Publication Data

US 2021/0039489 A1    Feb. 11, 2021

(30) Foreign Application Priority Data

Aug. 9, 2019    (JP) .............................. JP2019-148012

(51) Int. Cl.
| | | |
|---|---|---|
| B60K 15/063 | (2006.01) |
| H01M 8/04082 | (2016.01) |
| B60L 50/72 | (2019.01) |
| F17C 13/04 | (2006.01) |

(52) U.S. Cl.
CPC ......... *H01M 8/04201* (2013.01); *B60L 50/72* (2019.02); *F17C 13/04* (2013.01); *B60K 2015/0634* (2013.01); *F17C 2205/0111* (2013.01); *F17C 2205/0317* (2013.01); *F17C 2221/012* (2013.01); *F17C 2270/0184* (2013.01); *H01M 2250/20* (2013.01)

(58) Field of Classification Search
CPC ..... F17C 2205/0317; F17C 2205/0111; B60K 2015/0634
See application file for complete search history.

(56) References Cited

U.S. PATENT DOCUMENTS

| | | | | |
|---|---|---|---|---|
| 7,270,209 | B2 * | 9/2007 | Suess | B60K 15/03006 224/538 |
| 7,337,799 | B2 * | 3/2008 | Delfino | B60K 15/03006 137/79 |
| 7,624,753 | B2 * | 12/2009 | Suess | B60K 15/063 137/259 |

(Continued)

FOREIGN PATENT DOCUMENTS

| | | |
|---|---|---|
| CN | 206298814 U | 7/2017 |
| CN | 109386733 A | 2/2019 |
| JP | 201935442 A | 3/2019 |

*Primary Examiner* — Kevin F Murphy
(74) *Attorney, Agent, or Firm* — Hauptman Ham, LLP

(57) ABSTRACT

A pressure vessel mounting structure includes: a manifold including a discharge gas passage branching from a general passage via which a container body communicates with a valve; a fusible plug valve configured to close the discharge gas passage and to, when the fusible plug valve is melted, open the discharge gas passage such that the high-pressure gas is discharged; a case including a bottom face portion covering the container body and the manifold from below in the vehicle up-down direction, the case including a bead placed near the fusible plug valve, the bead being formed by protruding a part of the bottom face portion upward in the vehicle up-down direction; and a communicating opening via which a space under a floor of a vehicle communicates with the fusible plug valve, the communicating opening being formed in a part of the bead, the part facing the fusible plug valve.

6 Claims, 7 Drawing Sheets

(56) References Cited

U.S. PATENT DOCUMENTS

| | | | | |
|---|---|---|---|---|
| 8,550,105 B2* | 10/2013 | Ishitoya | ............... | F16K 1/307 |
| | | | | 137/72 |
| 10,493,843 B2* | 12/2019 | Okawachi | ............. | B60K 15/07 |
| 2010/0276024 A1* | 11/2010 | Iida | ................. | H01M 8/04089 |
| | | | | 137/899 |
| 2019/0047404 A1 | 2/2019 | Sawai | | |

* cited by examiner

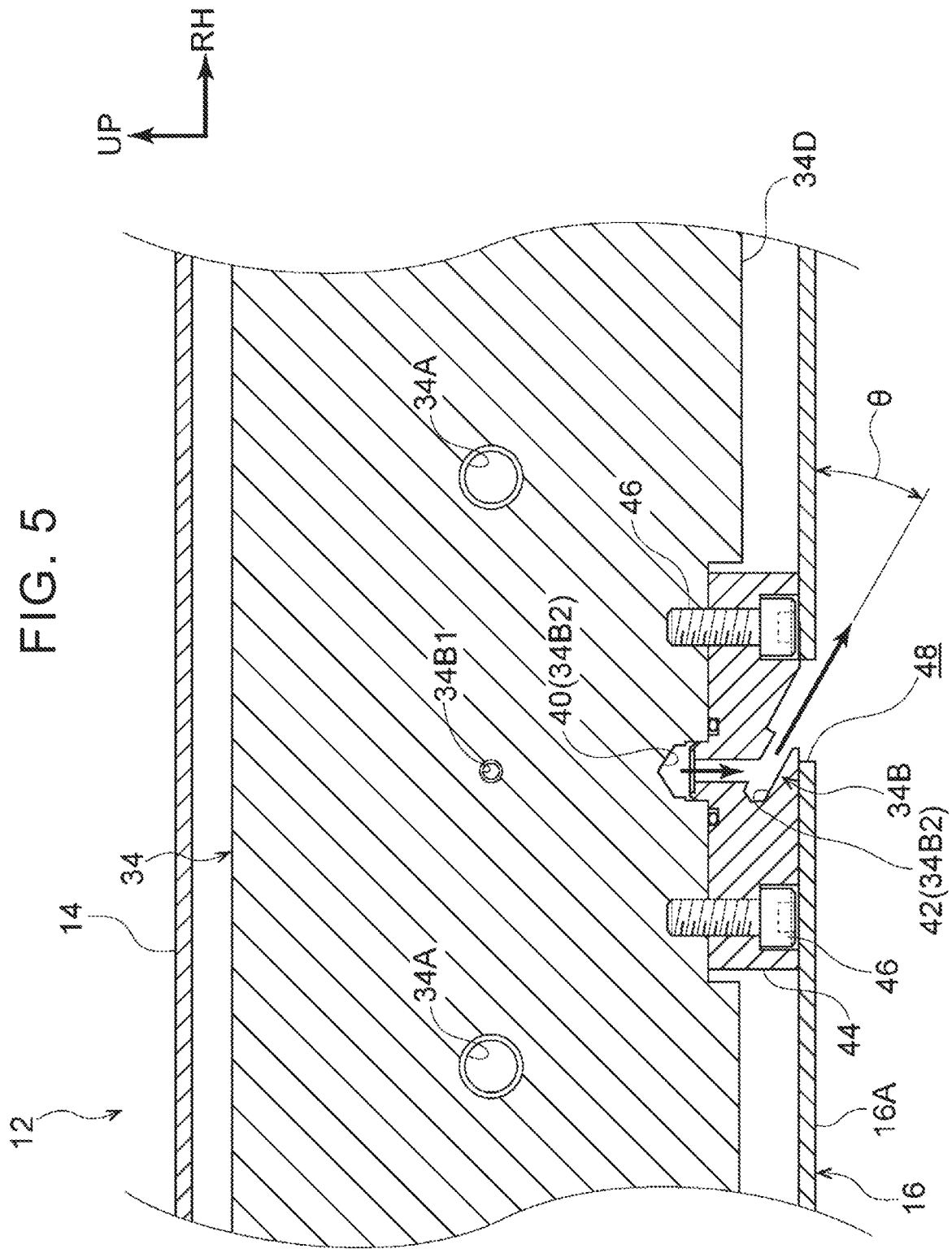

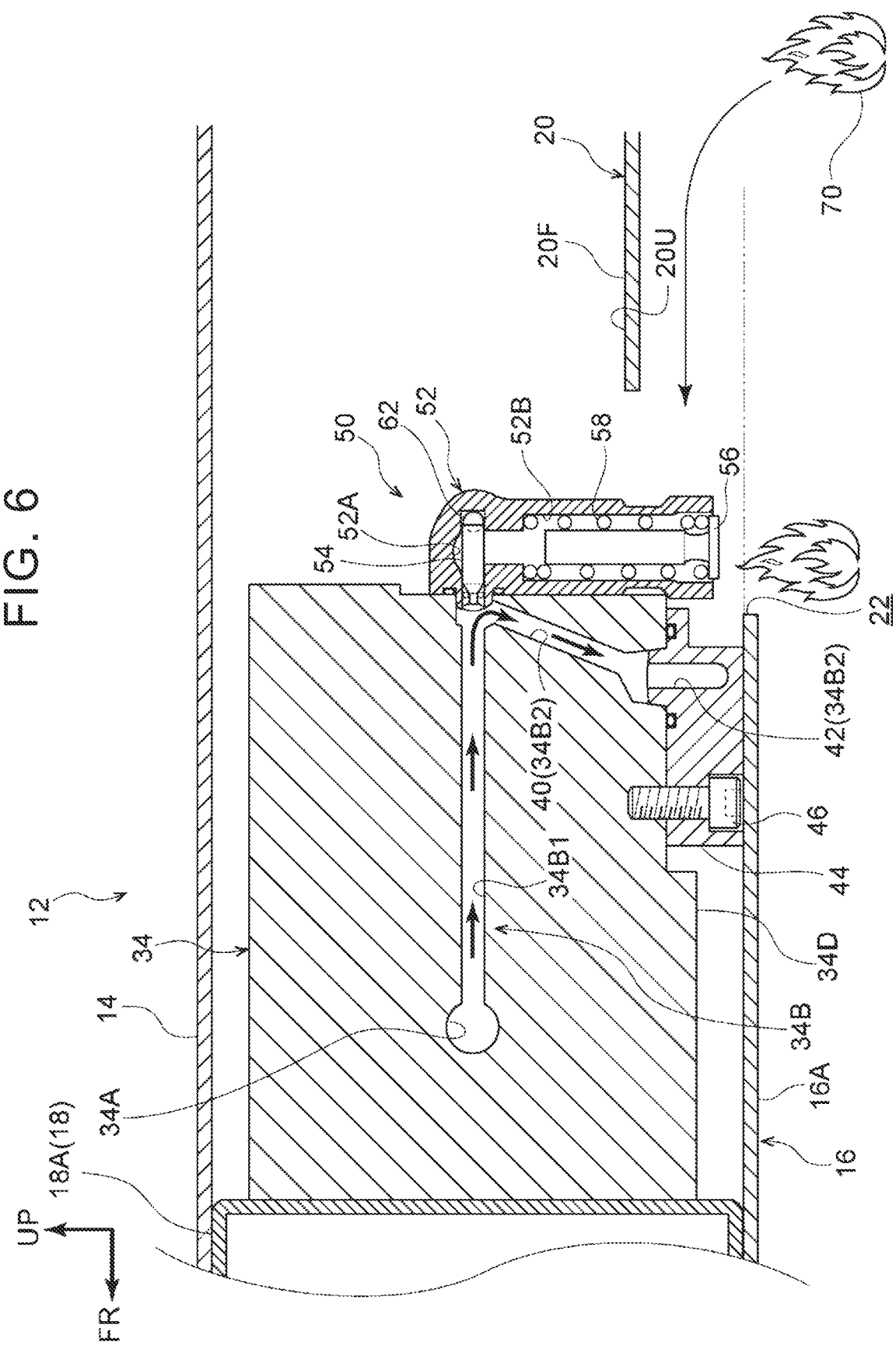

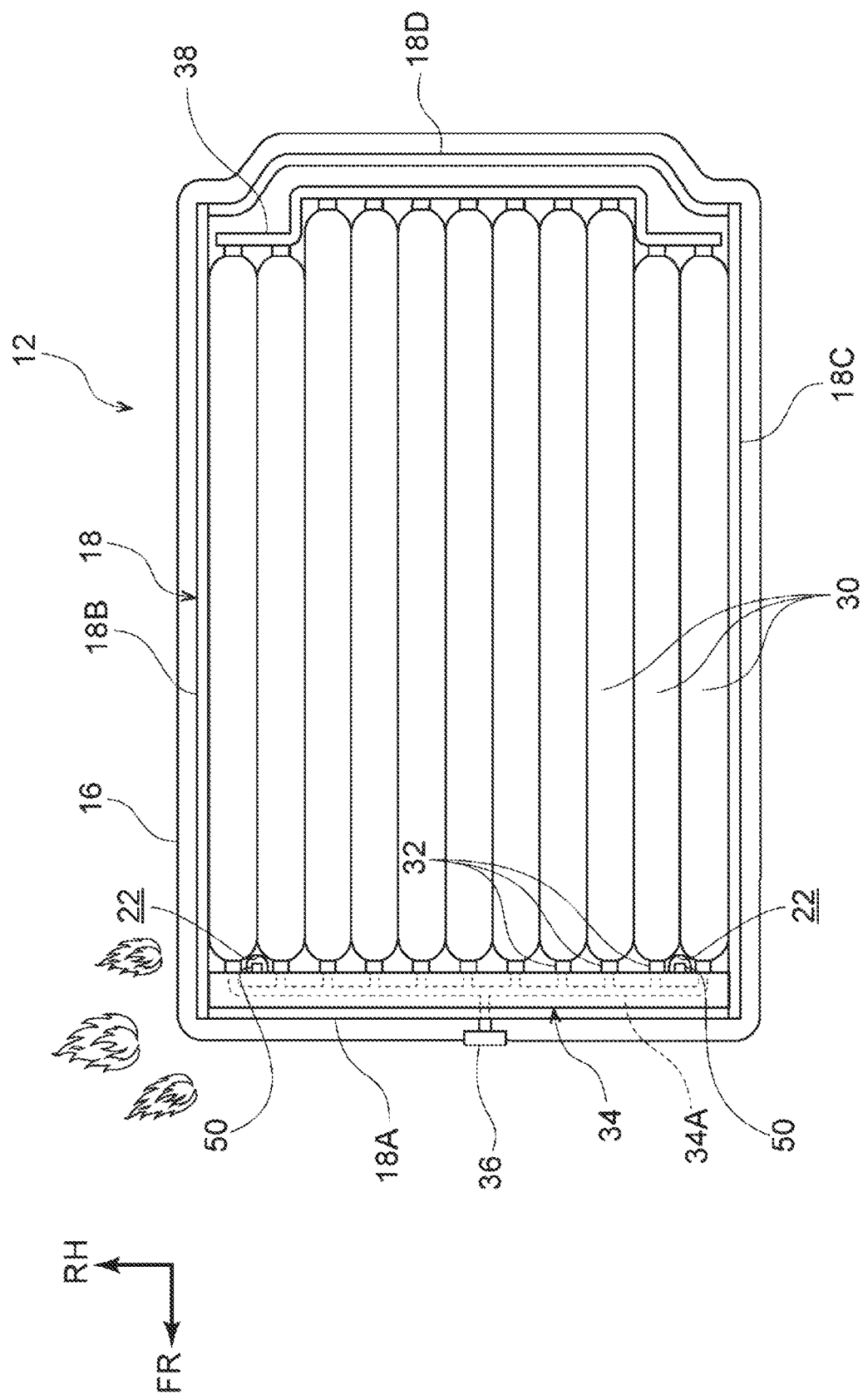

PRESSURE VESSEL MOUNTING STRUCTURE

INCORPORATION BY REFERENCE

The disclosure of Japanese Patent Application No. 2019-148012 filed on Aug. 9, 2019 including the specification, drawings and abstract is incorporated herein by reference in its entirety.

BACKGROUND

1. Technical Field

The present disclosure relates to a pressure vessel mounting structure.

2. Description of Related Art

Japanese Unexamined Patent Application Publication No. 2019-035442 (JP 2019-035442 A) describes a structure in which a cover member is provided in a lower part of a vehicle, and a fuel tank is placed inside the cover member. In JP 2019-035442 A, the inside of the fuel tank communicates with its outside via a tubular member, and the tubular member is closed by a fusible plug valve. When the lower part of the vehicle reaches a high temperature under a heating environment by a flame exposure test or the like (hereinafter just referred to as "under a heating environment"), heat is transmitted to the fusible plug valve via the cover member and the tubular member, so that the fusible plug valve melts. Hereby, fuel inside the tank is discharged.

SUMMARY

However, in the structure described in JP 2019-035442 A, heat is transmitted to the fusible plug valve via the cover member and the tubular member. In view of this, there is room for improvement in that heat of a vehicle lower part is transmitted to the fusible plug valve efficiently.

The present disclosure is achieved in consideration of the above fact, and an object of the present disclosure is to provide a pressure vessel mounting structure that can improve efficiency of heat transmission to a fusible plug valve when a vehicle lower part reaches a high temperature in terms of a structure where a pressure vessel is provided in the vehicle lower part.

A pressure vessel mounting structure according to a first aspect includes a container body, a pipe, a fusible plug valve, a cover member, and a communicating opening. In the container body, high-pressure gas is stored, and the container body is provided in a vehicle lower part. The pipe includes a general passage via which the container body communicates with a valve configured to open and close the container body, and a discharge gas passage branching from the general passage. The fusible plug valve is configured to close the discharge gas passage and to, when the fusible plug valve is at least partially melted, open the discharge gas passage such that the high-pressure gas stored in the container body is discharged to a space under a floor of a vehicle. The cover member includes a bottom face portion covering the container body and the pipe from below in the vehicle up-down direction. The cover member includes a protrusion placed near the fusible plug valve, the protrusion being formed by protruding a part of the bottom face portion upward in the vehicle up-down direction. The space under the floor of the vehicle communicates with the fusible plug valve via the communicating opening, and the communicating opening is formed in a part of the protrusion, the part facing the fusible plug valve.

In the pressure vessel mounting structure according to the first aspect, the container body in which high-pressure gas is stored is provided in the vehicle lower part, and the pipe is connected to the container body. The pipe includes the general passage and the discharge gas passage, and the general passage is configured such that the container body communicates, via the general passage, with the valve configured to open and close the container body. Meanwhile, the discharge gas passage branches from the general passage, and generally, the discharge gas passage is closed by the fusible plug valve. Hereby, when the vehicle lower part reaches a high temperature, the fusible plug valve is at least partially melted, so that the high-pressure gas stored in the container body can be discharged from the discharge gas passage.

Here, the cover member is provided in the vehicle lower part, and the container body and the pipe are covered with the bottom face portion of the cover member from below in the vehicle up-down direction. In the bottom face portion, the protrusion formed by protruding a part of the bottom face portion upward in the vehicle up-down direction is placed near the fusible plug valve. Further, the bottom face portion has the communicating opening formed in a part of the protrusion, the part facing the fusible plug valve, and the space under the floor of the vehicle communicates with the fusible plug valve via the communicating opening. Hereby, in a part where the protruding portion is provided, a distance between the fusible plug valve and the bottom face portion is shortened. Accordingly, when the vehicle lower part reaches a high temperature, heat transmission to the fusible plug valve is performed quickly via the communicating opening of the protrusion. As a result, in comparison with a configuration in which heat of the vehicle lower part is transmitted to the fusible plug valve via the cover member, efficiency of heat transmission to the fusible plug valve is increased.

A pressure vessel mounting structure according to a second aspect is as follows. That is, in the configuration of the first aspect, the protrusion may be formed in an elongated shape in a plan view such that one end of the protrusion in a longitudinal direction is placed to face the fusible plug valve. The communicating opening may be formed in the one end of the protrusion.

In the pressure vessel mounting structure according to the second aspect, the one end, in the longitudinal direction, of the protrusion formed in an elongated shape in a plan view is placed to face the fusible plug valve, and the communicating opening is formed in the one end. Accordingly, in a case where the vehicle lower part reaches a high temperature due to flames by a flame exposure test or the like, for example, the flames are guided along an elongated recess of the protrusion under the vehicle. This makes it possible to guide the flames under the floor of the vehicle to the communicating opening at an early stage.

A pressure vessel mounting structure according to a third aspect is as follows. That is, in the configuration of the first or second aspect, the protrusion may include a plurality of protrusions formed in the bottom face portion of the cover member, and the protrusions may be provided as reinforcement beads configured to reinforce the bottom face portion.

In the pressure vessel mounting structure according to the third aspect, the protrusions are provided as reinforcement beads. This accordingly makes it possible to increase efficiency of heat transmission to the fusible plug valve by providing the protrusions and also to improve protection performance for the container body by improving the rigidity of the bottom face portion.

A pressure vessel mounting structure according to a fourth aspect is as follows. That is, in the configuration of any one of the first to third aspects, the communicating opening may be closed by a lid member, and a melting point of the lid member may be set to be lower than a melting point of the bottom face portion of the cover member.

In the pressure vessel mounting structure according to the fourth aspect, the lid member is placed in the bottom face portion, and generally, the communicating opening is closed by the lid member. Further, the melting point of the lid member is set to be lower than the melting point of the bottom face portion. Accordingly, in a case where the vehicle lower part reaches a high temperature, the lid member melts to open the communicating opening. Thus, in a normal time, the communicating opening is closed by the lid member, thereby making it possible to protect the container body and so on from pebbles scattered under the floor of the vehicle.

A pressure vessel mounting structure according to a fifth aspect is as follows. That is, in the configuration of any one of the first to fourth aspects, the general passage may extend along the vehicle width direction. The discharge gas passage may branch from an outer end portion, in the vehicle width direction, of the general passage and extend to outside the bottom face portion. When the discharge gas passage is opened, the discharge gas passage may discharge the high-pressure gas downward in the vehicle up-down direction and outward in the vehicle width direction.

In the pressure vessel mounting structure according to the fifth aspect, the general passage of the pipe extends along the vehicle width direction, and the discharge gas passage branches from the outer end portion of the general passage in the vehicle width direction. Further, the discharge gas passage extends from the general passage to outside the bottom face portion and is configured such that, when the discharge gas passage is opened, the high-pressure gas stored in the container body is discharged downward in the vehicle up-down direction and outward in the vehicle width direction. Thus, the high-pressure gas can be discharged outward in the vehicle width direction. As a result, in comparison with a configuration where the high-pressure gas is discharged just downward in the vehicle up-down direction, it is possible to restrain the gas from staying in the space under the floor of the vehicle.

A pressure vessel mounting structure according to a sixth aspect is as follows. That is, in the configuration of the fifth aspect, the discharge gas passage may include a pair of discharge gas passages such that the discharge gas passages branch from a right end portion, in the vehicle width direction, of the general passage and a left end portion, in the vehicle width direction, of the general passage, respectively. The fusible plug valve may include a pair of fusible plug valves such that the fusible plug valves are provided on a right side in the vehicle width direction and on a left side in the vehicle width direction in the vehicle lower part so as to close the discharge gas passages, respectively.

In the pressure vessel mounting structure according to the sixth aspect, the fusible plug valves are provided on the right side in the vehicle width direction and on the left side in the vehicle width direction in the vehicle lower part. On this account, even in a case where the position of a heat source that increases the temperature of the vehicle lower part to be high is biased to one side in the vehicle width direction, for example, heat is quickly transmitted to the fusible plug valve on the one side, so that its corresponding discharge gas passage can be opened at an early stage. Hereby, even in a case where the position of the heat source that increases the temperature of the vehicle lower part to be high is biased to one side, it is possible to improve the efficiency of heat transmission to the fusible plug valve.

As described above, in terms of a structure where a pressure vessel is provided in the vehicle lower part, the pressure vessel mounting structure according to the first aspect has an excellent effect of improving efficiency of heat transmission to the fusible plug valve when the vehicle lower part reaches a high temperature.

The pressure vessel mounting structure according to the second aspect has such an excellent effect that, when the vehicle lower part reaches a high temperature due to flames by an exposure test or the like, the flames under the floor of the vehicle can be guided to the communicating opening at an early stage.

The pressure vessel mounting structure according to the third aspect has such an excellent effect that the efficiency of heat transmission to the fusible plug valve can be increased and protection performance for the container body can be improved.

The pressure vessel mounting structure according to the fourth aspect has such an excellent effect that the container body and so on can be protected from pebbles scattered under the floor of the vehicle in a normal time.

The pressure vessel mounting structure according to the fifth aspect has an excellent effect of restraining the high-pressure gas from staying in the space under the floor of the vehicle when the high-pressure gas is discharged.

The pressure vessel mounting structure according to the sixth aspect has an excellent effect of improving the efficiency of heat transmission to the fusible plug valve even when the position of a heat source that increases the temperature of the vehicle lower part to be high is biased to one side.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 5 is an enlarged sectional view illustrating the manifold cut along a line V-V in FIG. 4 in an enlarged manner;

FIG. 6 is an enlarged sectional view illustrating the manifold corresponding to FIG. 4 in a case where a fusible plug valve melts from a state of FIG. 4; and FIG. 7 is a plan view corresponding to FIG. 2 and illustrates a modification of the pressure vessel mounting structure according to the present embodiment.

DETAILED DESCRIPTION OF EMBODIMENTS

The following describes a pressure vessel mounting structure according to the present embodiment with reference to FIGS. 1 to 6. Note that an arrow FR, an arrow UP, and an arrow RH described in each figure appropriately indicate the front side in the vehicle front-rear direction, the upper side in the vehicle up-down direction, and the right side in the vehicle width direction in a vehicle 10 to which the pressure vessel mounting structure is applied. Hereinafter, in a case where a description is made by use of merely the front and rear sides, the upper and lower sides, and the right and left sides, they indicate the front and rear sides in the vehicle front-rear direction, the upper and lower sides in the vehicle up-down direction, and the right and left side in the vehicle width direction in a state facing toward an advancing side, respectively, unless otherwise specified.

Vehicle 10

Figure 1:
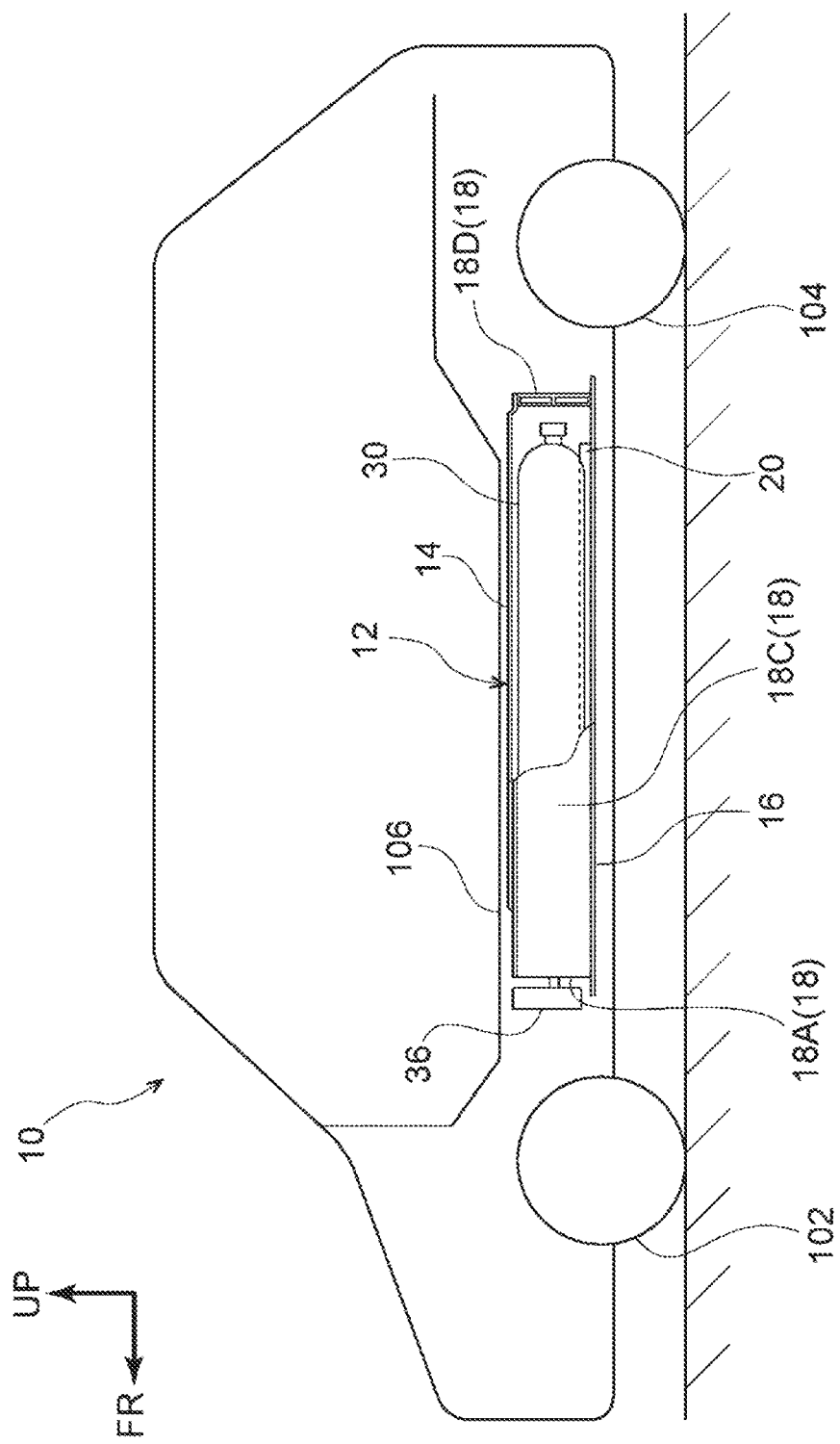
FIG. 1 is a side view schematically illustrating a vehicle to which a pressure vessel mounting structure according to the present embodiment is applied.

As illustrated in FIG. 1, the vehicle 10 to which the pressure vessel mounting structure according to the present embodiment is applied includes a motor (not shown) serving as a drive source. The motor is mechanically connected to driving wheels (at least either of front wheels 102 and rear wheels 104) of the vehicle 10 directly or indirectly via shift means such as a deceleration gear train. Hereby, driving force output from the motor is transmitted to the driving wheels.

Further, the vehicle 10 includes a fuel cell stack (not shown). Electric power is generated when hydrogen and air are supplied to the fuel cell stack, and the electric power is supplied from the fuel cell stack to the motor so that the motor is driven. That is, the vehicle 10 is a so-called fuel cell vehicle.

Case 12

A case 12 as a cover member is placed between the front wheels 102 and the rear wheels 104 in a vehicle lower part of the vehicle 10. More specifically, the case 12 is placed below a floor panel 106 constituting a floor of a vehicle cabin.

The case 12 includes a top face portion 14, a bottom face portion 16, and a peripheral wall portion 18, and the case 12 is formed in a box shape. Container bodies 30 are provided inside the case 12.

Figure 2:
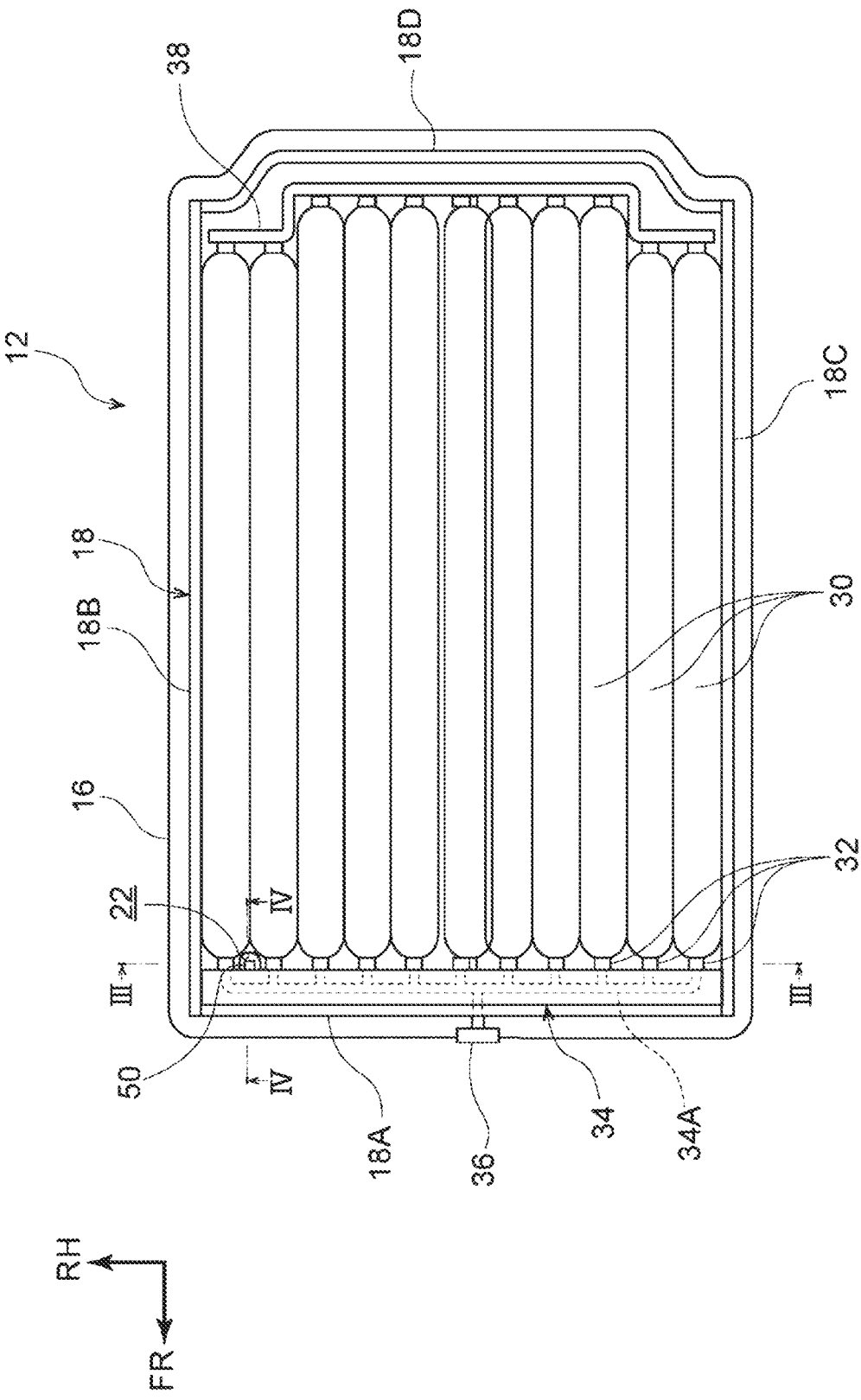
FIG. 2 is a plan view illustrating an overall configuration of the pressure vessel mounting structure according to the present embodiment.

As illustrated in FIG. 2, the bottom face portion 16 of the case 12 is a plate-shaped member formed in a generally rectangular shape in a plane view. The bottom face portion 16 is formed to have an outer shape larger than that of the peripheral wall portion 18. Both end portions of the bottom face portion 16 in the vehicle width direction are joined to a vehicle frame member such as a rocker (not shown), so that the case 12 is fixed to the vehicle 10.

The peripheral wall portion 18 is provided on the bottom face portion 16 in a standing manner so as to constitute a peripheral wall of the case 12. Further, the peripheral wall portion 18 includes a front wall 18A provided on the front side in the vehicle front-rear direction so as to extend in the vehicle width direction, and a pair of side walls 18B, 18C is provided such that the side walls 18B, 18C extend rearward in the vehicle front-rear direction from a right end portion and a left end portion of the front wall 18A, respectively. Further, respective rear ends of the side walls 18B, 18C are connected to each other via a rear wall 18D extending in the vehicle width direction. Note that the front wall 18A, the side walls 18B, 18C, and the rear wall 18D are each formed in a closed sectional shape by extrusion molding or the like and serve as roles of reinforcements for reinforcing the case 12.

Figure 3:
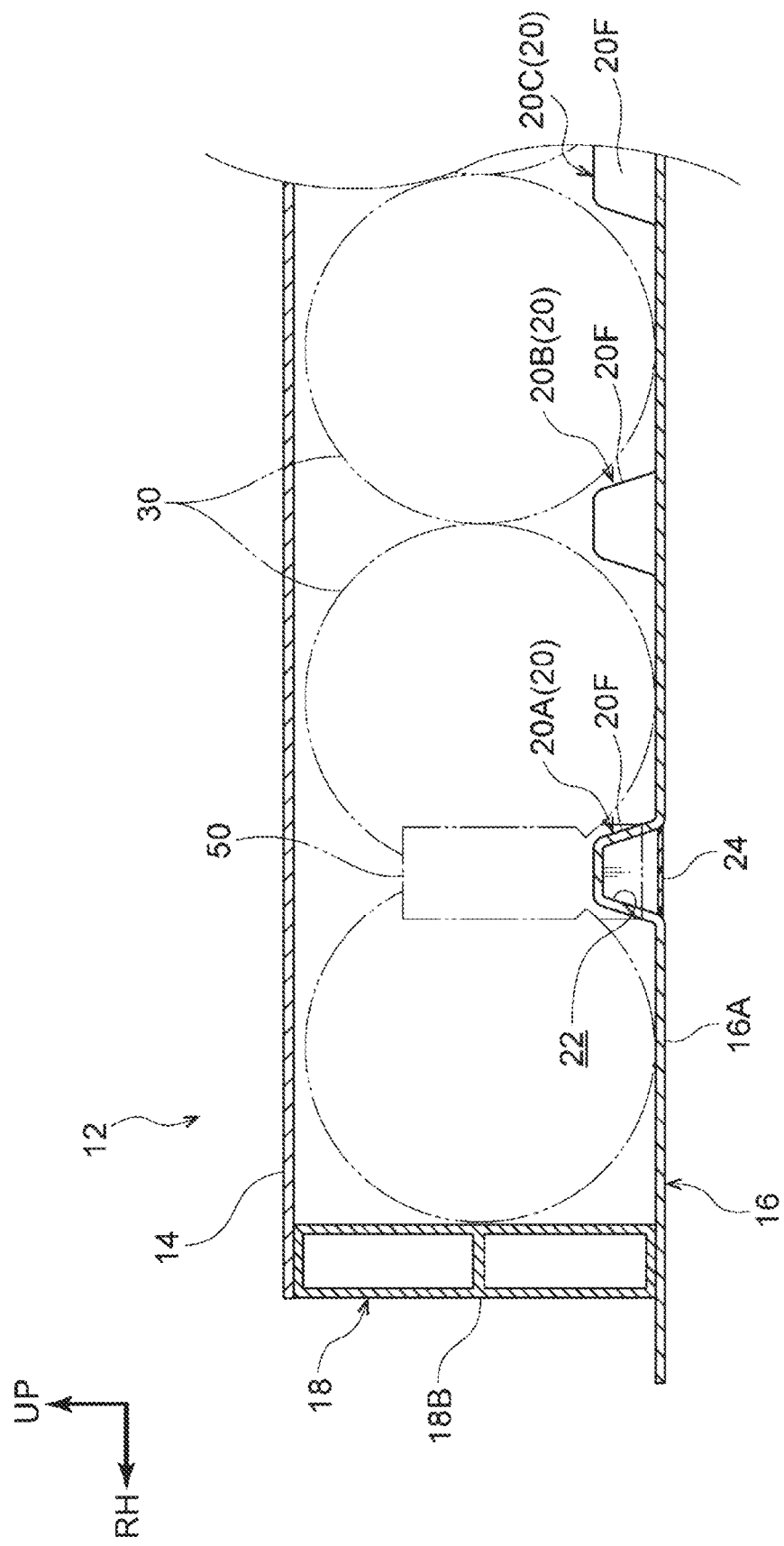
FIG. 3 is an enlarged sectional view illustrating a case cut along a line III in FIG. 2 in an enlarged manner.

As illustrated in FIG. 3, the top face portion 14 of the case 12 is a plate-shaped member with its thickness direction being along the vehicle up-down direction, and the top face portion 14 has a shape corresponding to the peripheral wall portion 18. Further, a peripheral portion of the top face portion 14 is put on a top face of the peripheral wall portion 18 and is joined thereto.

Bead 20

Here, the bottom face portion 16 of the case 12 is provided with a plurality of beads 20 (20A, 20B, 20C in FIG. 3) as protrusions. Each bead 20 is formed by protruding the bottom face portion 16 upward in the vehicle up-down direction such that each bead 20 projects upward from a general surface 16A of the bottom face portion 16, the general surface 16A extending generally horizontally. Further, the beads 20 are formed in an elongated shape extending in the vehicle front-rear direction in a plan view, and the beads 20 are placed at predetermined intervals in the vehicle width direction. In the present embodiment, one bead 20 is placed between the container bodies 30 adjacent to each other. Hereby, a sectional secondary moment of the whole bottom face portion 16 increases, thereby increasing rigidity.

Note that, in FIG. 3, a sectional shape of the bead 20 when the bead 20 is cut along the vehicle width direction is a generally trapezoidal shape opened downward in the vehicle up-down direction. However, the bead 20 is not limited to this, and the sectional shape of the bead 20 may be a semispherical shape or triangular shape opened downward in the vehicle up-down direction.

Figure 4:
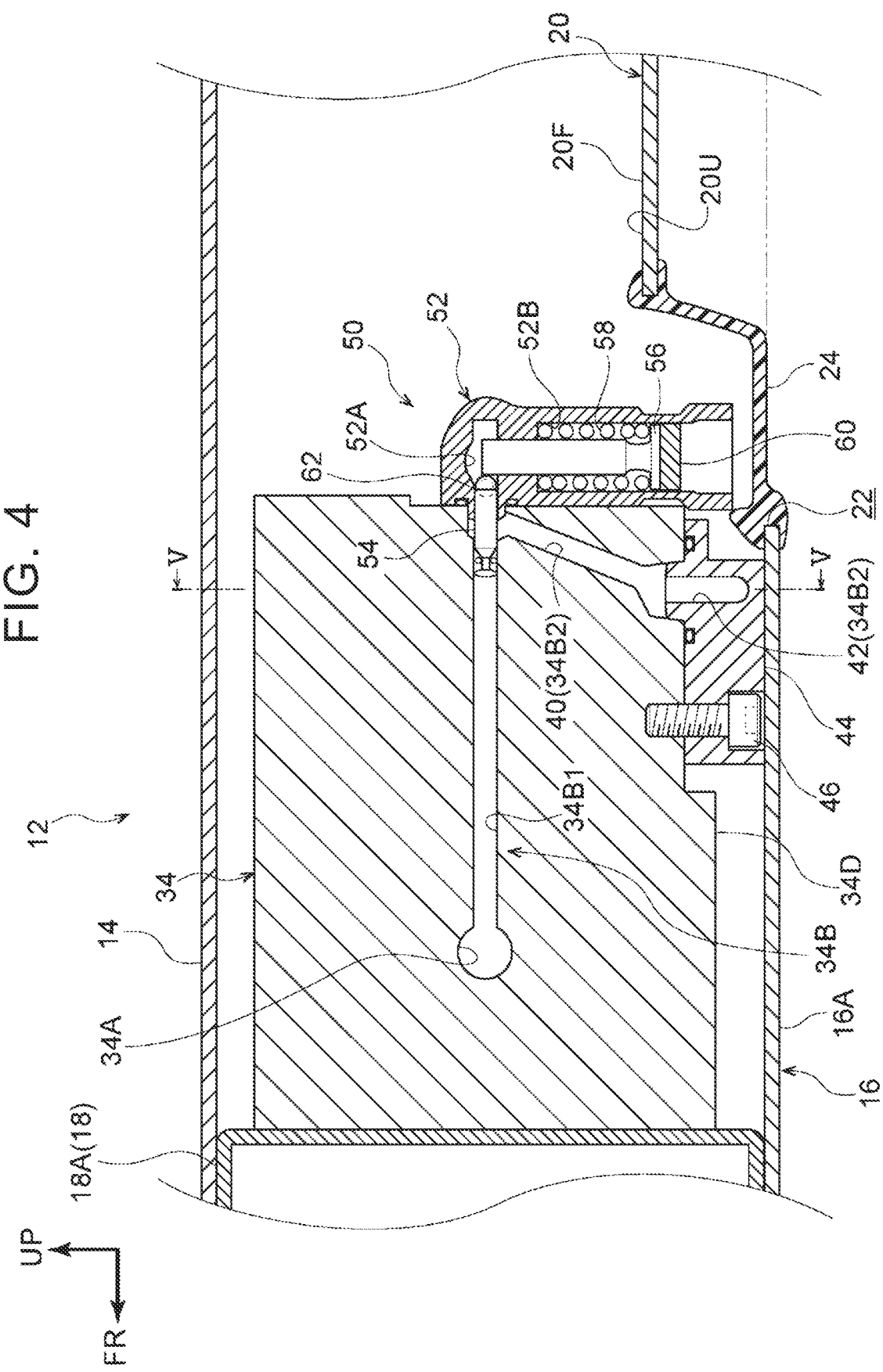
FIG. 4 is an enlarged sectional view illustrating a manifold cut along a line IV-IV in FIG. 2 in an enlarged manner.

Further, as illustrated in FIGS. 2 and 4, the bead 20 placed on the outer side, in the vehicle width direction, of the bottom face portion 16 is placed near a fusible plug valve 50 (described later). More specifically, front end portions (first ends in the longitudinal direction) 20F of the beads 20 in the vehicle front-rear direction are placed along a rear side face, in the vehicle front-rear direction, of a manifold 34 (described later) provided on a front end side of the case 12 in the vehicle front-rear direction. The front end portion 20F of one bead 20 placed on the outer side, in the vehicle width direction, of the case 12 is placed to face the fusible plug valve 50 fixed to the rear side face of the manifold 34. Further, the bead 20 placed on the outer side in the vehicle width direction is configured such that its top face 20U is placed slightly upward in the vehicle up-down direction from a heat-sensitive portion 60 of the fusible plug valve 50. Further, a communicating opening 22 penetrating through the bottom face portion 16 is formed in the front end portion 20F of the bead 20 placed on the outer side in the vehicle width direction. Thus, a space under the floor of the vehicle communicates with the fusible plug valve 50 via the communicating opening 22. Note that, in the present embodiment, the communicating opening 22 is formed in a range from a part of the general surface 16A of the bottom face portion 16, the part facing the fusible plug valve 50 in the vehicle up-down direction, to the front end portion 20F of the bead 20.

Lid Member 24

In the meantime, generally, a lid member 24 is attached to the communicating opening 22 so as to prevent pebbles and so on scattered from a road surface from entering the case 12. The lid member 24 is formed in a plate shape one size larger than the communicating opening 22, and the lid member 24 is attached by fitting an edge of the communicating opening 22 into a groove formed in a peripheral portion of the lid member 24. The lid member 24 is formed by use of a material such that a melting point of the lid member 24 is lower than a melting point of the bottom face portion 16 of the case 12. In the present embodiment, the lid member 24 is made of a resin material having flammability.

Container Body 30

As illustrated in FIG. 2, the container bodies 30 are placed inside the case 12. The container bodies 30 are each formed generally in a cylindrical shape and extend with their axial directions being along the vehicle front-rear direction. The container bodies 30 are configured such that hydrogen gas as high-pressure gas can be stored therein.

In the present embodiment, eleven container bodies 30 are provided inside the case 12 so as to be arranged side by side in a line (in a layer form) along the vehicle width direction. Further, two container bodies 30 placed in a right end portion in the vehicle width direction are formed to have a short length in the axial direction as compared with the other container bodies 30. Note that, in the present embodiment, the container bodies 30 are mainly made of aluminum alloy. However, the container bodies 30 are not limited to this, and the container bodies 30 may be mainly made of resin.

Manifold 34

Here, a mouth piece 32 is attached to an end portion, on a first side in the axial direction (the front side in the vehicle front-rear direction), of the container body 30, and the manifold 34 as a pipe is connected to the mouth piece 32. The manifold 34 extends along the front wall 18A of the peripheral wall portion 18, with its longitudinal direction being along the vehicle width direction. The manifold 34 includes a general passage 34A via which internal spaces of the container bodies 30 communicate with each other. Further, a valve 36 is provided in a central part of the manifold 34 in the longitudinal direction, and the container bodies 30 communicate with the valve 36 provided on the outside of the case 12 via the general passage 34A. The valve 36 is an opening-closing valve having a function to open and close the container bodies 30, and the valve 36 is connected to the fuel cell stack (not shown) via connecting means such as a pipe. By adjusting opening and closing of the valve 36, a supply amount of hydrogen gas to be supplied to the fuel cell stack from the container bodies 30 is adjusted.

In the meantime, end portions, on the second side in the axial direction (the rear side in the vehicle front-rear direction), of the container bodies 30 are fixed to the bottom face portion 16 of the case 12 via a bracket 38. Thus, the container bodies 30 are not movable inside the case.

As illustrated in FIGS. 4 and 5, the manifold 34 includes a discharge gas passage 34B branching from the general passage 34A, the discharge gas passage 34B being provided in an outer end portion (a right end portion in FIG. 3) of the manifold 34 in the vehicle width direction. The discharge gas passage 34B includes a horizontal passage 34B1 and a vertical passage 34B2. The horizontal passage 34B1 extends rearward in the vehicle front-rear direction from the general passage 34A. The vertical passage 34B2 extends downward in the vehicle up-down direction from the horizontal passage 34B1 and then bends to extend outward in the vehicle width direction.

The following describes the vertical passage 34B2 in detail. An upstream side of the vertical passage 34B2 serves as a first passage 40 branching from the horizontal passage 34B1 and extending downward in the vehicle up-down direction and slightly forward in the vehicle front-rear direction (see FIG. 4). Further, as illustrated in FIG. 5, a downstream side of the vertical passage 34B2 serves as a second passage 42 connected to a lower end portion of the first passage 40 and diagonally extending downward in the vehicle up-down direction and outward in the vehicle width direction. The second passage 42 is formed in a block-shaped guidance member 44 placed below the manifold 34 in the vehicle up-down direction. The guidance member 44 is fixed to a bottom face 34D of the manifold 34 by use of fasteners such as bolts 46. Note that, in the present embodiment, the bottom face portion 16 of the case 12 extends generally along the horizontal direction, and an inclination angle $\theta$ of the second passage to the bottom face portion 16 is set to satisfy $\theta=30°$.

A lower end portion of the second passage 42 is connected to a discharge opening 48 formed in a part, of the bottom face portion 16, on the front side in the vehicle front-rear direction and on the outer side in the vehicle width direction, so that the lower end portion of the second passage 42 is opened to outside the case 12. Hereby, high-pressure gas discharged through the discharge gas passage 34B is discharged downward in the vehicle up-down direction and outward in the vehicle width direction (see the direction indicated by arrows in FIG. 5). Note that, in order to restrain discharged gas from staying in the space under the floor of the vehicle, the discharge opening 48 is formed outward, in the vehicle width direction, from the communicating opening 22 on the bottom face portion 16.

As illustrated in FIG. 4, a rear end portion of the horizontal passage 34B1 in the discharge gas passage 34B is opened on the rear side face, in the vehicle front-rear direction, of the manifold 34. Generally, the opening is closed by the fusible plug valve 50.

Fusible Plug Valve 50

The fusible plug valve 50 includes a body portion 52, a horizontal plug 54, a vertical plug 56, a coiled spring 58, and the heat-sensitive portion 60 as main constituents. The body portion 52 is formed generally in a columnar shape and includes a horizontal tubular portion 52A and a vertical tubular portion 52B each having a tubular cavity thereinside. The horizontal tubular portion 52A extends in the vehicle front-rear direction and is connected to the rear end portion of the horizontal passage 34B1 in the discharge gas passage 34B. Meanwhile, the vertical tubular portion 52B is perpendicular to the horizontal tubular portion 52A and extends in the vehicle up-down direction.

Inside the horizontal tubular portion 52A, the horizontal plug 54 having a generally columnar shape and extending in the vehicle front-rear direction is placed coaxially. The horizontal plug 54 enters a connecting portion of the horizontal passage 34B1 with the first passage 40 in the vertical passage 34B2 such that the horizontal plug 54 generally closes the first passage 40. Hereby, generally, the discharge gas passage 34B is closed by the fusible plug valve 50.

In the meantime, inside the vertical tubular portion 52B, the vertical plug 56 having a generally columnar shape and extending in the vehicle up-down direction is placed coaxially. An upper end portion of the vertical plug 56 abuts with a rear end portion of the horizontal plug 54 via a spherical bearing 62. Further, the vertical plug 56 is put on the heat-sensitive portion 60 closing a lower end portion of the vertical tubular portion 52B in a normal time. In this state, the vertical plug 56 is biased downward in the vehicle up-down direction by the coiled spring 58 accommodated in the vertical tubular portion 52B in a compressed state in the axial direction. Note that the heat-sensitive portion 60 is formed in a discoid shape. The heat-sensitive portion 60 is made of fusible alloy made of a material such as low melting metal, e.g., lead, tin, or the like as an example, and the communicating opening 22 is placed below the heat-sensitive portion 60 in the vehicle up-down direction. When the vehicle lower part reaches a high temperature, the heat-sensitive portion 60 melts and opens the vertical tubular portion 52B downward in the vehicle up-down direction.

With the use of the fusible plug valve 50 configured as such, when the vehicle lower part reaches a high temperature, the heat-sensitive portion 60 melts, so that the vertical tubular portion 52B is opened downward in the vehicle up-down direction. As a result, the vertical plug 56 drops due to biasing force of the coiled spring 58. In the meantime, in the general passage 34A of the manifold 34, the horizontal plug 54 moves rearward in the vehicle front-rear direction due to an increase in internal pressure of the container bodies 30. Hereby, the horizontal passage 34B1 communicates with the vertical passage 34B2 in the discharge gas passage 34B. Thus, high-pressure gas is discharged from the discharge opening 48 (see the direction indicated by arrows in FIGS. 5 and 6).

Next will be described a case where the lower part of the vehicle 10 reaches a high temperature due to flames. As illustrated in FIG. 6, in the lower part of the vehicle 10, the lid member 24 attached to the communicating opening 22 melts by heat of flames, so that the communicating opening 22 is opened. At this time, a flame distant from the communicating opening 22 is also guided to the communicating opening 22 along a recess of the bead 20, so that the flame reaches the fusible plug valve 50 placed inside the case 12. Note that, in FIG. 6, the flame distant from the communicating opening 22 is indicated by a reference numeral 70.

At this time, since the heat-sensitive portion 60 of the fusible plug valve 50 is melted, high-pressure gas stored in the container bodies 30 flows into the discharge gas passage 34B from the general passage 34A of the manifold 34, so that the high-pressure gas is discharged from the discharge opening 48, as illustrated in FIGS. 5 and 6. The high-pressure gas is discharged downward in the vehicle up-down direction and outward in the vehicle width direction along the inclination direction of the second passage 42 of the discharge gas passage 34B.

Operation

Next will be described an operation of the present embodiment.

In the pressure vessel mounting structure of the present embodiment, the container bodies 30 in which high-pressure gas is stored are provided in the lower part of the vehicle 10, and the manifold 34 is connected to the container bodies 30. The manifold 34 includes the general passage 34A and the discharge gas passage 34B, and the container bodies 30 communicate with the valve 36 via the general passage 34A. Meanwhile, the discharge gas passage 34B branches from the general passage 34A, and generally, the discharge gas passage 34B is closed by the fusible plug valve 50. Hereby, in a case where the lower part of the vehicle 10 reaches a high temperature under a heating environment, the fusible plug valve 50 is at least partially melted, so that the high-pressure gas stored in the container bodies 30 can be discharged from the discharge gas passage 34B.

Here, the case 12 is provided in the lower part of the vehicle 10, and the container bodies 30 and the manifold 34 are covered with the bottom face portion 16 of the case 12 from below in the vehicle up-down direction. The beads 20 are formed in the bottom face portion 16 such that the bottom face portion 16 is partially protruded upward in the vehicle up-down direction, and one of the beads 20 is placed near the fusible plug valve 50. Further, the bottom face portion 16 has the communicating opening 22 formed in a part, of the front end portion 20F of the one of the beads 20, that faces the fusible plug valve 50. The space under the floor of the vehicle communicates with the fusible plug valve 50 via the communicating opening 22. Hereby, a distance between the bottom face portion 16 and the fusible plug valve 50 is shortened in the front end portion 20F of the one of the beads 20. Accordingly, when the lower part of the vehicle 10 reaches a high temperature, heat transmission to the fusible plug valve 50 is performed quickly via the communicating opening 22 of the one of the beads 20. As a result, in comparison with a configuration in which heat is transmitted to the fusible plug valve 50 via the case 12, it is possible to increase efficiency of heat transmission to the fusible plug valve 50.

Further, the beads 20 are formed to protrude upward in the vehicle up-down direction from the general surface 16A of the bottom face portion 16. On this account, with the configuration in which the bottom face portion 16 does not project downward in the vehicle up-down direction, it is possible to improve efficiency of heat transmission to the fusible plug valve 50. This makes it possible to restrain the lower part of the vehicle 10 from interfering with a road surface.

Further, in the present embodiment, the front end portion (the first end in the longitudinal direction) 20F of the one of the beads 20 formed in an elongated shape is placed to face the fusible plug valve 50, and the communicating opening 22 is formed in the front end portion 20F. Hereby, in a case where the lower part of the vehicle 10 reaches a high temperature due to flames caused by a flame exposure test or the like, for example, the flames are guided along recesses of the beads 20 under the vehicle. This makes it possible to guide the flames under the floor of the vehicle to the communicating opening 22 at an early stage.

Further, in the present embodiment, the rigidity of the bottom face portion 16 is increased by providing the beads 20. This makes it possible to increase efficiency of heat transmission to the fusible plug valve 50 and to improve protection performance for the container bodies 30 by improving the rigidity of the bottom face portion 16.

Further, in the present embodiment, the lid member 24 is placed on the bottom face portion 16, and generally, the communicating opening 22 is closed by the lid member 24. Further, the melting point of the lid member 24 is set to be lower than the melting point of the bottom face portion 16. Accordingly, in a case where the lower part of the vehicle 10 reaches a high temperature, the lid member 24 melts to open the communicating opening 22. Thus, the communicating opening 22 is closed by the lid member 24 in a normal time, thereby making it possible to protect the container bodies 30 and so on from pebbles scattered under the floor of the vehicle.

Further, in the present embodiment, the general passage 34A of the manifold 34 extends along the vehicle width direction, and the discharge gas passage 34B branches from the outer end portion of the general passage 34A in the vehicle width direction. Further, the discharge gas passage 34B extends from the general passage 34A to outside the bottom face portion 16 and is configured such that, when the discharge gas passage 34B is opened, high-pressure gas stored in the container bodies 30 is discharged downward in the vehicle up-down direction and outward in the vehicle width direction. The high-pressure gas can be discharged outward in the vehicle width direction as such. As a result, in comparison with a configuration where the high-pressure gas is discharged just downward in the vehicle up-down direction, it is possible to restrain the gas from staying in the space under the floor of the vehicle.

Modifications

As illustrated in FIG. 7, in a pressure vessel mounting structure according to a modification, the fusible plug valves 50 are placed in the right end portion and the left end portion, in the vehicle width direction, of the lower part of the vehicle 10. Further, the fusible plug valves 50 close discharge gas passages (not shown) branching from a right end portion and a left end portion, in the vehicle width direction, of the general passage 34A in the manifold 34, respectively. Note that the discharge gas passages have a configuration similar to that of the discharge gas passage 34B described above.

In the above configuration, in a case where a heat source is placed at a position closer to the right side of the vehicle 10 in the vehicle width direction as illustrated in FIG. 7, for example, heat is quickly transmitted to the fusible plug valve 50 on the right side, in the vehicle width direction, of the lower part of the vehicle 10. Hereby, the fusible plug valve 50 is melted, so that the high-pressure gas is discharged outward in the vehicle width direction from the discharge gas passage placed on the right side in the vehicle width direction. On the other hand, in a case where a heat source is placed at a position closer to the left side of the vehicle 10 in the vehicle width direction, heat is quickly transmitted to the fusible plug valve 50 on the left side in the vehicle width direction. Hereby, the high-pressure gas is discharged outward in the vehicle width direction from the discharge gas passage placed on the left side in the vehicle width direction.

As described above, in the present modification, the fusible plug valves 50 are placed on the right side in the vehicle width direction and on the left side in the vehicle width direction in the lower part of the vehicle 10. On this account, even in a case where the position of a heat source that increases the temperature of the lower part of the vehicle 10 to be high is biased to one side in the vehicle width direction, heat is quickly transmitted to the fusible plug valve 50 on the one side, so that its corresponding discharge gas passage can be opened at an early stage. Hereby, even in a case where the position of the heat source that increases the temperature of the lower part of the vehicle 10 to be high is biased to one side, it is possible to improve efficiency of heat transmission to its corresponding fusible plug valve 50.

Supplementary Description

In the above embodiment and the modification, the box-shaped case 12 is a cover member. However, the present disclosure is not limited to this. The cover member should be configured to cover at least the container bodies 30 and the manifold 34 from below in the vehicle up-down direction, and the cover member may be constituted only by the bottom face portion 16 without the peripheral wall portion 18 and the top face portion 14, for example.

In the above embodiment and the modification, the protrusion is constituted by the bead 20 formed in an elongated shape and extending in the vehicle front-rear direction, but the present disclosure is not limited to this. The protrusion may have any configuration, provided that the protrusion is formed by protruding the bottom face portion 16 of the case 12 upward in the vehicle up-down direction so that the bottom face portion is made closer to the fusible plug valve 50. For example, the protrusion may be formed into a polygonal shape or a circular shape in a plan view.

Further, the number of beads 20 and the extending direction thereof are modifiable appropriately. For example, the present disclosure is not limited to the configuration in which the bead 20 is provided in every part between the container bodies adjacent to each other, and it is possible to reduce the number of the beads 20 appropriately. Further, the bead 20 may be placed only at a position corresponding to the fusible plug valve 50. Further, the bead may be extended in a direction inclined by a predetermined angle from the vehicle front-rear direction in a plan view, or the bead may be extended along the vehicle width direction.

Further, in the above embodiment and the modification, the communicating opening 22 is formed in the range from a part of the general surface 16A, the part being placed below the fusible plug valve 50 in the vehicle up-down direction, to the front end portion 20F of the bead 20. However, the present disclosure is not limited to this. For example, the communicating opening 22 may be formed at a position that overlaps only the bead 20 and that does not include the general surface 16A in the bottom face portion 16.

Further, in the above embodiment and the modification, the lid member 24 is made of a resin material having flammability, but the present disclosure is not limited to this. A lid member may be made of other materials such as alloy having a low melting point or an incombustible resin material, provided that the lid member melts prior to the bottom face portion 16 in a case where the lower part of the vehicle 10 reaches a high temperature.

Further, in the above embodiment, the fusible plug valve 50 is placed on the outer side, in the vehicle width direction, of the lower part of the vehicle 10. However, the present disclosure is not limited to this, and the position of the fusible plug valve is modifiable appropriately. For example, the fusible plug valve may be placed in the center in the vehicle width direction. Further, the placement of the discharge gas passage is also modifiable appropriately in accordance with an attachment position of the fusible plug valve.

Further, in the above embodiment, the discharge opening 48 from which the high-pressure gas is discharged is provided separately from the communicating opening 22 placed below the fusible plug valve 50 in the vehicle up-down direction. However, the present disclosure is not limited to this. Only the communicating opening may be provided in the bottom face portion so as to double as the discharge opening for the high-pressure gas.

Further, in the above modification, two fusible plug valves 50 are placed in the lower part of the vehicle 10. However, the present disclosure is not limited to this, and two or more fusible plug valves may be placed in the lower part of the vehicle.

What is claimed is:

1. A pressure vessel mounting structure comprising:
   a container body in which high-pressure gas is stored, the container body being provided in a vehicle lower part;
   a pipe including a general passage via which the container body communicates with a valve configured to open and close the container body, and a discharge gas passage branching from the general passage;

a fusible plug valve configured to close the discharge gas passage and to, when the fusible plug valve is at least partially melted, open the discharge gas passage such that the high-pressure gas stored in the container body is discharged to a space under a floor of a vehicle;

a cover member including a bottom face portion covering the container body and the pipe from below in a vehicle up-down direction, the cover member including a protrusion placed near the fusible plug valve, the protrusion being formed by protruding a part of the bottom face portion upward in the vehicle up-down direction; and a communicating opening via which the space under the floor of the vehicle communicates with the fusible plug valve, the communicating opening being formed in a part of the protrusion, the part facing the fusible plug valve.

2. The pressure vessel mounting structure according to claim 1, wherein:

the protrusion is formed in an elongated shape in a plan view such that one end of the protrusion in a longitudinal direction is placed to face the fusible plug valve; and the communicating opening is formed in the one end of the protrusion.

3. The pressure vessel mounting structure according to claim 1, wherein:

the protrusion includes a plurality of protrusions formed in the bottom face portion of the cover member; and the protrusions are provided as reinforcement beads configured to reinforce the bottom face portion.

4. The pressure vessel mounting structure according to claim 1, wherein:

the communicating opening is closed by a lid member; and a melting point of the lid member is set to be lower than a melting point of the bottom face portion of the cover member.

5. The pressure vessel mounting structure according to claim 1, wherein:

the general passage extends along a vehicle width direction;

the discharge gas passage branches from an outer end portion, in the vehicle width direction, of the general passage and extends to outside the bottom face portion; and when the discharge gas passage is opened, the discharge gas passage discharges the high-pressure gas downward in the vehicle up-down direction and outward in the vehicle width direction.

6. The pressure vessel mounting structure according to claim 5, wherein:

the discharge gas passage includes a pair of discharge gas passages such that the discharge gas passages branch from a right end portion, in the vehicle width direction, of the general passage and a left end portion, in the vehicle width direction, of the general passage, respectively; and the fusible plug valve includes a pair of fusible plug valves such that the fusible plug valves are provided on a right side in the vehicle width direction and on a left side in the vehicle width direction in the vehicle lower part so as to close the discharge gas passages, respectively.

* * * * *